United States Patent
Bashford

[11] 3,845,987
[45] Nov. 5, 1974

[54] VEHICLE SEATING

[75] Inventor: Gordon Dennis Bashford, Balsall Common, Nr. Coventry, England

[73] Assignee: The Rover Company Limited, Warwickshire, England

[22] Filed: July 16, 1973

[21] Appl. No.: 379,827

[30] Foreign Application Priority Data
Aug. 19, 1972 Great Britain..................... 38797/72

[52] U.S. Cl.................. 297/385, 297/216, 248/393
[51] Int. Cl............................................ A62b 35/00
[58] Field of Search .......... 297/346, 216, 385, 386, 297/387; 280/150 SB; 248/394, 395, 396, 397, 398, 393, 424

[56] References Cited
UNITED STATES PATENTS

| | | |
|---|---|---|
| 3,711,153 | 1/1973 | Cunningham...................... 297/346 |
| 3,727,977 | 4/1973 | Gmeiner............................. 297/385 |
| 3,734,562 | 5/1973 | Fourrey.............................. 297/385 |
| 3,746,393 | 7/1973 | Andres et al. ..................... 297/385 |
| 3,761,127 | 9/1973 | Giese et al........................... 248/394 |

Primary Examiner—James T. McCall
Attorney, Agent, or Firm—Brisebois & Kruger

[57] ABSTRACT

A vehicle seat has a rigid member attached to its frame. The member serves to slidably locate the seat in the vehicle as well as providing an anchorage point for a seat belt. The seat can thereby be freely moved relative to the vehicle without movement of the seat belt relative to the seat. The rigid member is deflectable on the vehicle striking an object to engage with a part of the vehicle so that the seat belt anchorage is limited against excessive movement.

6 Claims, 2 Drawing Figures

PATENTED NOV 5 1974  3,845,987

VEHICLE SEATING

This invention relates to vehicle seating.

According to a first aspect of the present invention a vehicle seat comprises:
i. a frame structure;
ii. a rigid member mounted on the frame structure;
iii. a slider mounted on the rigid member for slidable engagement with a runner on the vehicle; and
iv. a seat belt anchorage on the rigid member.

According to a second aspect of the invention there is provided a vehicle having a seat for mounting on a runner attached to the vehicle comprising:
i. a frame structure;
ii. a rigid member mounted on the frame structure;
iii. a slider mounted on the rigid member for slidable engagement with the runner; and
iv. a seat belt anchorage on the rigid member or an extension thereof.

In a preferred form of the second aspect of the invention the slider includes a deformable component such that a load in excess of a predetermined amount applied to the anchorage results in the member being deflected relative to the runner so as to engage the runner which engagement impedes further deflection of the member.

An embodiment of the invention will now be described, solely by way of example, with reference to the accompanying drawing of which:

Figure 1:
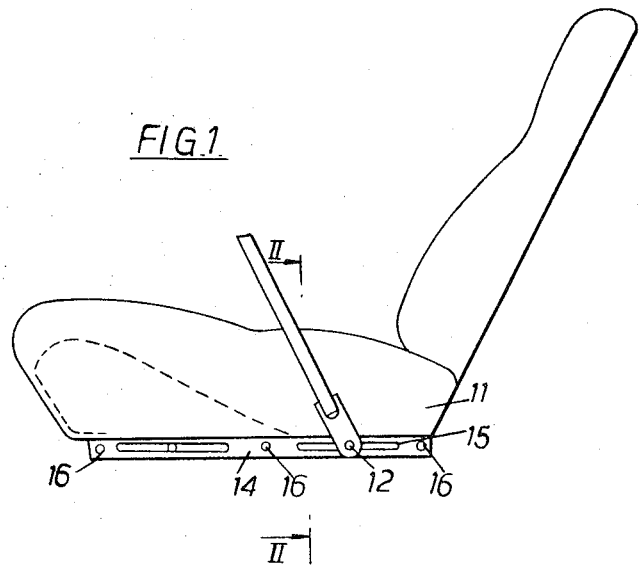
FIG. 1 is a side view of a vehicle seat according to the invention.
Figure 2:
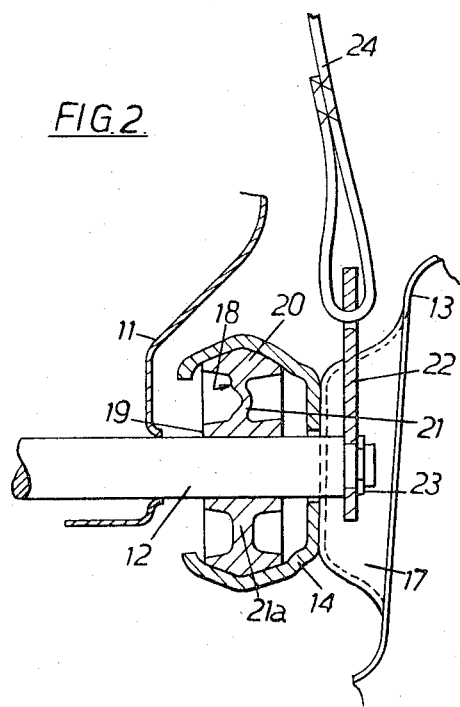
FIG. 2 is a sectional elevation on section II of FIG. 1.

Vehicle seat 11 has a bar 12 extending transversely across and projecting outside it. The vehicle body 13 has secured to it a runner 14 in which slots 15 are provided which receive the ends of said bar and have a width (measured in a vertical direction) slightly greater than the outside diameter of the bar 12. The runner 14 has in it holes 16 whereby the runner is bolted to projections 17 formed at intervals along the vehicle bodywork.

The bar 12 is located by way of slider 18 in the runner 14. The slider 18 is of plastics material providing a low friction bearing between it and runner 14. The slider is made up of an inner boss 19 resting on the bar, top and bottom outer flanges 20 in sliding contact with the runner and a thin central upper web 21, and lower load supporting web 21a. The end of the bar 12 has a shackle 22 retained on it by way or circlip 23; the shackle serving as an anchorage for one end of a seat belt 24. Conventional locking means are provided for the seat whereby the seat can be locked against further movement on the runner when a convenient position relative to the vehicle body has been selected by the occupant.

In normal use the seat 11 is slidable on the runners 14 by virtue of the low frictional sliding contact between slider 18 and the runner 14. The use of both ends of bar 12 to provide anchorages for the seat belt 24 enables the relative position of belt and seat to be fixed regardless of the location of the seat in the vehicle. Thus different sizes of seat occupants in the vehicle are accommodated without altering the optimum relative disposition of the belt and seat.

Alternatively only one anchorage need be provided on the bar 12 the other end or ends of the belt being located on a mounting point provided in the vehicle body. With this arrangement an optimum relative disposition of belt and seat would still be obtainable without large seat loads arising on vehicle impact.

In the event of an impact in which the seat belt acts to restrain the occupant of the seat the shackles 22 are loaded by the belt. As a consequence the bar 12 is displaced upwardly relative to the runner 14 since the thin web 21 of the slider 18 deforms readily under the loading involved. The displacement of the bar causes it to contact the edge of the slot 15 in the runner so providing considerably increased resistance to further deflection of the bar relative to the body than that provided solely by deformation of the slider 18.

I claim:

1. A vehicle having a seat mounted on a runner including a channel portion and receiver means, said runner being attached to said vehicle, said vehicle comprising:
i. a frame structure for said seat;
ii. a rigid member mounted on the frame structure;
iii. a seat belt anchorage attached to the rigid member; and
iv. a slider mounted on the rigid member for slidable engagement with the runner; the slider including a deformable component adapted, when a load in excess of a predetermined load is applied to the anchorage, to deform so that the rigid member is deflected, relative to the channel portion sufficiently to cause engagement between the rigid member and the receiver portion, thereby limiting further deflection of the rigid member relative to the channel portion.

2. A vehicle as claimed in claim 1 wherein the receiver means includes a component defining a slot oriented in the direction of movement of the slider, the end of the rigid member normally being a clearance fit in the slot except when the rigid member engages the receiver portion.

3. A vehicle as claimed in claim 1 wherein the deformable component is of plastics material and incorporates a webbed portion whereat the component is caused to deform.

4. A vehicle as claimed in claim 1 wherein the seat incorporates engagement means whereby the seat can be located at any one of a plurality of positions along the runner.

5. A vehicle as claimed in claim 1 incorporating a seat belt having one end attached to the seat belt anchorage and the other end or ends attached to the vehicle.

6. A vehicle as claimed in claim 1 incorporating a seat belt having one end attached to the seat belt anchorage and the other end or ends attached to another part of the rigid member.

* * * * *